United States Patent [19]

Calmettes et al.

[11] Patent Number: 5,208,949
[45] Date of Patent: May 11, 1993

[54] ELASTIC CLAMP FITTING

[75] Inventors: Lionel Calmettes; Michel Andre, both of Romorantin Lanthenay, France

[73] Assignee: Etablissements Caillau, France

[21] Appl. No.: 804,962

[22] Filed: Dec. 11, 1991

[30] Foreign Application Priority Data

Dec. 19, 1990 [FR] France ................ 90 15955

[51] Int. Cl.⁵ .............................................. B65D 63/00
[52] U.S. Cl. ...................... 24/20 R; 24/20 S; 24/20 CW; 24/271
[58] Field of Search ............ 24/20 R, 20 CW, 20 EE, 24/20 TT, 20 S, 20 LS, 19, 271, 268, 16 R, 20 W, 23 EE

[56] References Cited

U.S. PATENT DOCUMENTS

| | | | |
|---|---|---|---|
| 3,420,436 | 9/1968 | Oetikee . | |
| 4,275,484 | 6/1981 | Irio et al. | 24/20 R |
| 4,402,113 | 9/1983 | Smith | 24/20 R |
| 4,821,379 | 4/1989 | Spaulding | 24/20 R |
| 4,843,686 | 7/1989 | Bartholomew | 24/271 |
| 4,907,319 | 3/1990 | Calmettes et al. | 24/20 R |
| 4,919,682 | 4/1990 | Bellazzi | 24/20 R |
| 4,924,558 | 5/1990 | Calmettes | 24/20 R |

FOREIGN PATENT DOCUMENTS 1065634  1/9672  United Kingdom ........... 24/20 CW

*Primary Examiner*—Victor N. Sakran
*Attorney, Agent, or Firm*—Marshall & Melhorn

[57] ABSTRACT

A clamp fitting is disclosed, constituted by a metal band wound on itself, whose ends are respectively provided with complementary hooking means, comprising a hook capable of passing behind a shoulder or ear during the clamping operation. The clamp fitting presents at least one group of two undulations, each in the form of an open loop, projecting radially with respect to the outer periphery of the clamp fitting, the zone of join of at least one undulation to the clamp fitting being constituted by a portion of band of circular section, whose radius is at least equal to twice the thickness of the band and which extends over an arc of at least 90° and preferably close to 150°.

13 Claims, 1 Drawing Sheet

ELASTIC CLAMP FITTING

FIELD OF THE INVENTION

The present invention relates to an elastic clamp fitting.

BACKGROUND OF THE INVENTION

Patent EP-A-3 192 discloses a band clamp fitting constituted by a band of metal wound on itself, of which the two ends are respectively provided with a radial fold, forming bearing point for tightening the clamp by means of a tool of the pliers type.

The radial fold of one of the ends of the band, preferably the end of the outer portion, is provided with a hook capable of passing behind the radial fold of the other end, during the clamp tightening operation, with a view to hooking thereon and thus maintaining the clamp fitting in its tightened position. On the other hand, the end of the inner portion of the band whose radial fold is preferably without hook, extends beyond said fold at least beyond the hook in the closed position of the clamp fitting.

Such a clamp fitting is largely used in industry, in particular in automobile construction, particularly for fixing a flexible pipe fitted on a rigid tube.

However, as the requirements of the art are becoming more and more severe, it appears essential to give the clamp fittings of the type in question a structure such that it may satisfy two apparently contradictory conditions.

In fact, without accepting a noteworthy modification of the radial pressure exerted by the clamp fitting on the clamped member, such as a rubber hose-pipe, the clamp fitting is now required, on the one hand, to be capable of elastic extension under the effect of the thermal expansions, which are sometimes considerable, of the clamped member and of its support, for example during operation of an engine, on the other hand, to be capable of elastic retraction if the ambient temperature becomes much lower than the temperature at which the clamp fitting was assembled, for example after the engine has been stopped in a very cold zone.

It is therefore an object of the invention to provide a clamp fitting of the type in question which satisfies these two contradictory requirements.

SUMMARY OF THE INVENTION

According to the invention, the clamp fitting presents at least one group of two undulations, each in the form of an open loop, projecting radially with respect to its outer periphery. The zone of join (juncture) of at least one undulation to the clamp fitting is constituted by a portion of band of circular section, whose radius is at least equal to twice the thickness of the band and which extends over an arc of at least 90° and preferably close to 150°.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
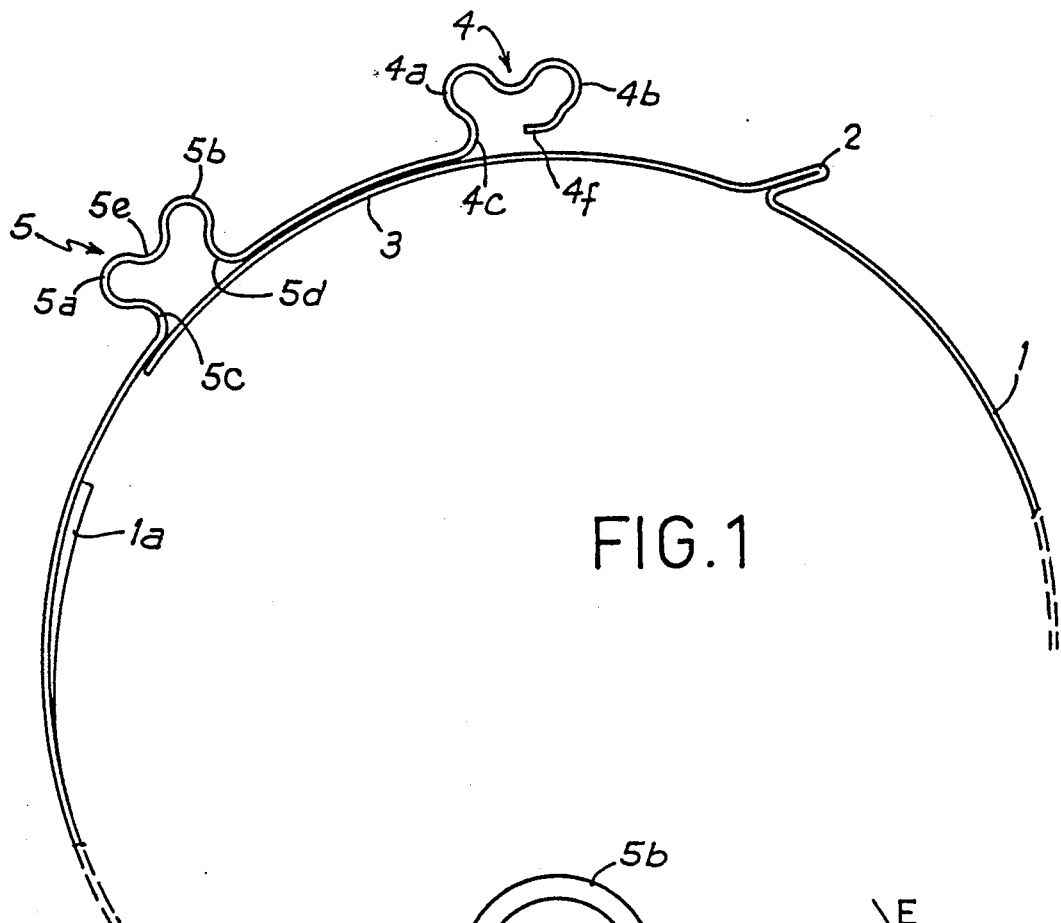
FIG. 1 is a view in elevation and in section of a band clamp fitting according to the invention.

Referring now to the drawings, a band clamp fitting is shown, of the type described in the European Patent mentioned in the preamble. The metal band 1, wound on itself, comprises, in the vicinity of the end of the inner portion, an ear 2 constituted by a radial fold, which joins an extension 3 located beneath the outer portion. The latter comprises a hook generally referenced 4.

When the clamp fitting is open, as shown in the drawing, hook 4 is located at some distance from ear 2, but extension 3 already extends beyond hook 4. As is seen, the terminal edge of extension 3 preferably presents the form of a fork capable of cooperating with a boss 1a projecting radially on the inner face of the band, as described in Patent EP-A-243 224.

On the outer portion of the clamp fitting, at some distance from hook 4, the band is shaped with various folds, projecting radially with respect to the clamp fitting and constituting what has already been called "a group of two undulations", generally referenced 5. Each of the two undulations 5a and 5b is itself in the form of an open loop (or demi-loop), of which one of the ends joins the clamp fitting and the other end joins the opposite end of the other undulation.

Figure 2:
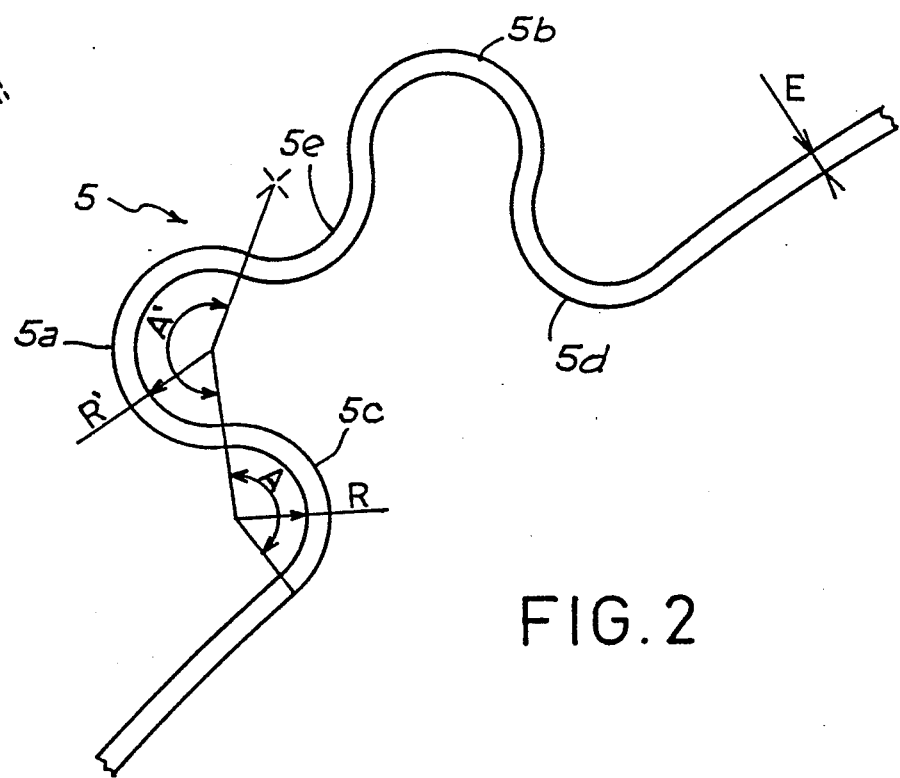
FIG. 2 is an enlarged view of a "group of two undulations".

Referring more particularly to FIG. 2, the zone of join 5c (or 5d) of undulation 5a (or 5b) to the clamp fitting is constituted by a portion of band 1 whose section, clearly visible in the drawing, is substantially circular. Radius R of the circle of this zone of join must be sufficient, for reasons which will be apparent hereinafter, without, however, leading to too great a radial projection of the undulations.

It has been ascertained that it is virtually indispensable that radius R be at least equal to twice the thickness E of the metal band, in order to obtain the desired results.

Moreover, it is essential that the arc of circle A constituted by a zone of join, between the portion of the clamp fitting and the beginning of undulation 5a (or 5b), be at least equal to 90° and even preferably close to 150°. Measurement of this arc of circle A is, of course, made between the perpendiculars dropped, from the centre of the circle of radius R, on the one hand on the portion of the clamp fitting, on the other hand, on the band in the region of change of curvature between the zone of join and the corresponding undulation.

One undulation 5a (or 5b) is preferably also constituted by a portion of band of circular section, of which the radius R' will advantageously be close to that of its zone of join to the clamp fitting. As a function of the technical imperatives, particularly the requirements of limitation of radial space requirement, radius R' may nevertheless be greater than radius R.

Finally, the two undulations 5a and 5b are joined to each other by a portion 5e, preferably also circular, whose concavity is generally the opposite of that of the two undulations 5a and 5b.

It will be emphasized here that the arc of circle A' corresponding to one undulation — its measurement being made, similarly to that previously described, between the two regions of change of curvature located at the ends of the undulation — will advantageously be as large as possible, taking into account manufacturing requirements. In practice, this arc A' must without doubt not exceed 250°, with the result that the undulation will generally present the form of an open demi-loop. In this latter case, portion 5e is necessarily curved, its concavity, as already indicated, facing the outside of the clamp fitting and its curvature preferably being at the most equal to that of the zones of join 5c and 5d. However, it will be readily imagined that this portion 5e might be rectilinear in certain embodiments of the invention.

As may be seen in the drawing, hook 4 is itself constituted by a group of two undulations 4a and 4b whose shape is similar and preferably identical to that of the undulations 5a and 5b described hereinabove. Similarly, the zone of join 4c of hook 4 to the outer portion of the clamp fitting as well as portion 4e of join of the two undulations 4a and 4b will present similar shapes, preferably identical to those of elements 5c and 5e previously described. However, it is obvious that one of the ends 4f of undulation 4b must be free to constitute the free end of hook 4.

When the clamp fitting is being tightened, the tool bears on ear 2 and the zone of join 4a in order to pass the free end 4f of hook 4 behind ear 2. In the example shown, extension 3 extends beyond the group of undulations 5 when the clamp fitting is in open position. This may not always be the case, but it is essential, as is known, that, when the clamp fitting is in closed position, this extension extend not only beneath hook 4 but also beyond the space located between the two zones of join 5c and 5d.

Obviously, a clamp fitting according to the invention may comprise only the group of undulations 5, its hook 4 being made in a known manner. Similarly, it may comprise a hook 4 of the type such as the one described without any group of undulations 5 being provided or, on the contrary, even if several groups of undulations 5 are provided.

In the course of clamping, the various undulations, as well as their zones and portions of join, are elastically deformed, such deformation being partially maintained after hook 4 has hooked behind ear 2.

The member to be clamped is thus subjected to a radial pressure by the clamp fitting, which pressure may be determined by a judicious choice of the thickness of the band, the stiffness of the material, and the various parameters evoked hereinabove, such as the radii R and R', and angles A and A'.

If the member to be clamped undergoes an expansion, generally of thermal origin, greater than that of the clamp fitting, the radial pressure that the clamp fitting exerts thereon does not increase unduly. In fact, thanks to its various undulations, the clamp fitting may easily absorb the differential expansion, without permanent deformation of any zone of the metal band of which the material may remain within its domain of elasticity. On the other hand, if the member to be clamped and the clamp fitting undergo a considerable cooling, for example if they are located in a very cold region where the temperature is much lower than the ambient temperature at the moment of assembly of the clamp fitting, the initial elastic deformation of the clamp fitting and the energy thus stored enable it to contract and compensate the reduction in the diameter of the member to be clamped, whilst maintaining a sufficient radial pressure thereon.

What is claimed is:

1. A clamp comprising:
   a) a metal band wound on itself including an inner end provided with a first lug and an outer end provided with a hook to form a complementary fastening means, the hook adapted to pass over the first lug during the clamping operation; and
   b) at least one group of alternating undulations projecting outwardly from the outer periphery of said metal band and forming an M-shaped portion, said group of undulations including a first joining section connecting said group of undulations to said metal band, the first joining section having a radius of at least twice the thickness of said metal band and extending through an arc of at least 90°.

2. The clamp of claim 1, wherein the first joining section of said group of undulations extends through an arc of about 150°.

3. The clamp of claim 1, wherein said group of undulations is spaced apart from the hook of said metal band and further includes a second joining section connecting said group of undulations to said metal band, the second joining section having a radius of at least twice the thickness of said metal band and extending through an arc of at least 90°.

4. The clamp of claim 1, wherein said group of undulations is disposed between the first joining section and the hook of said metal band.

5. The clamp of claim 1, wherein said group of undulations includes a plurality of alternating concave and convex arcuate sections, each arcuate section having a radius of at least twice the thickness of said metal band and extending through an arc of at least 90°.

6. The clamp defined in claim 1 including a plurality of said group of undulations formed in said metal band.

7. A clamp comprising:
   a) a band wound on itself including an inner end and an outer end, said band provided with complementary fastening means on the outer end and proximate the inner end of said metal band, the fastening means adapted to be coupled to each other;
   b) at least one tensioning loop projecting outwardly from said band, said tensioning loop including a group of alternating undulations forming an M-shaped portion; and
   c) a first arcuate structure joining said tensioning loop to said band, said first arcuate structure having a radius of at least twice the thickness of said band and extending through an arc of at least 90°.

8. The clamp defined in claim 7, wherein the fastening means of said band comprises a lug hook at the outer end of said band and a projecting lug proximate the inner end of said band.

9. The clamp defined in claim 8, wherein said group of undulations and said first arcuate structure form the lug hook.

10. The clamp defined in claim 7, wherein said band is metal.

11. The clamp defined in claim 7 including a plurality of tension loops in said band.

12. The clamp of claim 7, wherein said tensioning loop is spaced apart from the fastening means of said band and includes a second arcuate structure joining the tensioning loop to said band, the second arcuate structure having a radius of at least twice the thickness of said band and extending through an arc of at least 90°.

13. The clamp of claim 7, wherein said first arcuate structure extends through an arc of about 150°.

* * * * *